United States Patent [19]
Seino et al.

[11] Patent Number: 4,948,219
[45] Date of Patent: Aug. 14, 1990

[54] METHOD OF CONNECTING OPTICAL FIBERS AND CONNECTION AIDS AND FIBER HOLDERS EMPLOYED THEREWITH, AND OPTICAL WAVEGUIDE MODULES EMPLOYING SAME

[75] Inventors: Minoru Seino, Atsugi; Naoyuki Mekada, Hadano, both of Japan

[73] Assignee: Fujitsu Limited, Kawasaki, Japan

[21] Appl. No.: 170,320

[22] Filed: Mar. 18, 1988

[30] Foreign Application Priority Data

| Mar. 20, 1987 | [JP] | Japan | 62-64168 |
| May 25, 1987 | [JP] | Japan | 62-125730 |
| Jul. 20, 1987 | [JP] | Japan | 62-180542 |
| Nov. 17, 1987 | [JP] | Japan | 62-288459 |

[51] Int. Cl.$^5$ .......................... G02B 6/36; G02B 7/26
[52] U.S. Cl. ............................. 350/96.20; 350/96.21; 350/96.22; 350/96.24
[58] Field of Search ............... 350/96.20, 96.21, 96.22, 350/96.24

[56] References Cited

U.S. PATENT DOCUMENTS

| 4,097,118 | 6/1978 | Hammer | 350/96.17 |
| 4,102,561 | 7/1978 | Hawk et al. | 350/96.21 |
| 4,135,783 | 1/1979 | Kunze | 350/96.22 |
| 4,171,867 | 10/1979 | Cocito | 350/96.21 |
| 4,274,708 | 6/1981 | Cocito et al. | 350/96.22 |
| 4,288,143 | 9/1981 | DiVita | 350/96.22 |
| 4,632,505 | 12/1986 | Allsworth | 350/96.18 |
| 4,653,845 | 3/1987 | Tremblay et al. | 350/96.22 |
| 4,687,290 | 8/1987 | Prussas | 350/96.20 |
| 4,688,886 | 8/1987 | Stoerk | 350/96.21 |
| 4,741,591 | 5/1988 | Grabbe et al. | 350/96.21 |
| 4,784,458 | 11/1988 | Horowitz et al. | 350/96.22 |

FOREIGN PATENT DOCUMENTS 62-81611 4/1987 Japan ........................... 350/96.21
A0170457 5/1986 United Kingdom .

OTHER PUBLICATIONS

Patent Abstracts of Japan, vol. 2, no. 17, p. 10976 E77, 6th Feb. 1978; UP-A-52 134 451 (Nippon Denshin Denwa Kosha) 11-10-1977.
European Search Report, Appln. No. EP 88 302 387, Berlin, 12/9/88, Examiner K. Kemsley.
Patent Abstracts of Japan, vol. 7, no. 117 (p.-198) 1261 21st May 1983 & JP-A-35506 (Hitachi Kasei Kogyo K.K.) 2/3/83.
IEEE Journal of Lightwave Technology, vol. LT-3, no. 4, Aug. 1985, pp. 795-798, New York, US; E. J. Murphy et al.: "Permanent Attachment of Single-Mode Fiber Arrays to Waveguides".
Patent Abstracts of Japan, vol. 7, no. 164 (P-211) (1309) 19th Jul. 1983; & JP-!-58 7291 (Nippon Denshin Denwa Kosho) 02-05-1983.

Primary Examiner—William L. Sikes
Assistant Examiner—Robert E. Wise
Attorney, Agent, or Firm—Staas & Halsey

[57] ABSTRACT

A method of connecting optical fibers with each other or with optical waveguides using a connection aid. The connecting aid has a hole into which the fiber is inserted and secured and from which hole a tip portion of the fiber protrudes slightly, and an adhesive or solder is applied to a gap between two adjacent connection aids or between an end surface of the waveguide and an opposed surface of the connection aid. The connection aid may contain an array of two or more optical fibers. The connection method can be used to produce reliable, strong and low-loss connections between the optical fibers or between and optical waveguide and the optical fibers.

29 Claims, 18 Drawing Sheets

METHOD OF CONNECTING OPTICAL FIBERS AND CONNECTION AIDS AND FIBER HOLDERS EMPLOYED THEREWITH, AND OPTICAL WAVEGUIDE MODULES EMPLOYING SAME

BACKGROUND OF THE INVENTION

1. Field of the Invention

The present invention relates to improved methods of connecting optical fibers. More particularly, the present invention relates to methods of connecting optical fibers with each other or with optical waveguides. The present invention also relates to modules of optical waveguides connected to optical fibers and connection aids comprising an array of two or more optical fibers.

The present invention is useful in the field of fiber optics such as optical communication, optical transmission and the like.

2. Description of the Related Art

Optical fibers comprise a core and a cladding surrounding the core, and the core and cladding are both made from quartz, glass and plastic materials. The fibers generally have an outer diameter in the range of about 100 to 300 $\mu$m, and the diameter of the core is about 5 to 100 $\mu$m. The fibers have many advantages such as low loss, wide bandwidth or high capacity of signal transmission, small diameter, low weight, low cost and flexibility, and because of these advantages, the optical fibers are widely used in various optical devices.

The connection or splicing of optical fibers is usually made as illustrated in FIGS. 1 and 2. Before splicing, a vinyl or other coating or covering 2 is removed from a top portion of each optical fiber 1, and a top face of each fiber 1 is then polished and cleaned. The top faces of the fibers 1 are then placed in contact with each other and adhered with an adhesive 3. In this connection method, however, connection defects such as a dislocation of the optical axis, an inclined optical axis, and a separation of the top faces of the fibers tend to occur. In addition, a satisfactory bonding strength between the fibers can not be obtained and, therefore, the connected fibers must be handled with care.

Similar drawbacks are also found when connecting optical fibers with optical waveguides. Among the prior art methods, two methods for stably connecting the optical fibers are known. For example, K. H. Cameron teaches in Electron. Lett., Vol. 20, pp 974–976, Nov. 1984 that a small block of lithium niobate (LiNbO$_3$) is attached to an upper surface of an LiNbO$_3$ waveguide substrate, at the edge of the substrate, so that the end faces of the block and the waveguide formed in the substrate are on the same plane. As is apparent from FIGS. 3 and 4, an LiNbO$_3$ waveguide substrate 4 has a waveguide 5 formed on the upper surface thereof, which waveguide 5 is produced by a thermal diffusion of titanium, and the end face of the LiNbO$_3$ substrate 4 and that of the LiNbO$_3$ block 6 are on the same plane. An optical fiber 1 consists of core 7 and cladding 8, and this cladding 8 is removed from the top portion of the fiber 1. The core 7 of the fiber 1 is aligned with an end face of the Ti:LiNbO$_3$ waveguide 5 and while maintaining an intimate contact between the core 7 and the waveguide 5, a suitable adhesive 3 is applied to the surrounding contact area. This connection method is simple and provides a low excess loss because only the end face of the fiber is in contact with the waveguide, but the resulting connection is mechanically weak. Further, since a large amount of the adhesive must be used for this connection, dislocation of the axis of the fiber and separation of the top face of the fiber from the waveguide frequently occur as a result of an expansion of the adhesive in an elevated environmental temperature.

Another method is to secure the optical fiber in a V-grooved silicon block, as taught by E. J. Murphy et al., IEEE J. Lightwave Technol., Vol. LT-3, pp 795–799, Aug. 1985. As illustrated in FIGS. 5 and 6, two V-grooved silicon blocks 9 and 10 are combined and an optical fiber 1 from which a coating 2 is removed is secured in a V-groove 11 in the combined blocks 9 and 10. As in the Cameron method, an LiNbO$_3$ substrate 4 with a Ti:LiNbO$_3$ waveguide 5 is provided with an LiNbO$_3$ block 6. Since the substrate 4 and the block 6 have the same plane at the end face, they are firmly bonded with an end face of the blocks 9 and 10 by the action of an adhesive 3 applied therebetween. According to this method, a satisfactory bonding strength between the fiber 1 and the waveguide 5 can be attained, because the bonding is made between the large area of the waveguide substrate 4 and block 6 and the large area of the blocks 9 and 10, to secure the fiber 1. However, this method suffers from drawbacks in that, for example, many production steps are needed to complete this method, and thus it is cumbersome and expensive. Further, in order to avoid excess loss, it is essential to precisely align the fiber and waveguide. In practice, often a large excess loss occurs because of an imperfect matching between the end face of the fiber and that of the waveguide. Assuming that the end face of the fiber is disposed at an inclined angle of 1° from the end face of the waveguide, a gap of several tens of micrometers will be produced between the fiber and waveguide, and this gap results in large excess loss. Similar undesirable results will be induced when the end surface of the fiber or waveguide is polished at an angle of 1° from the correct polishing plane. It is therefore desirable to provide an improved low-loss, high-strength connection method for optical fibers and/or optical waveguides.

The connection between the optical fibers and optical waveguide can be applied to the production of optical waveguide modules which can be advantageously used in optical communication and optical sensing, for example. Two typical examples of the prior art waveguide modules are shown as a plane view and a cross-sectional view in FIGS. 7 and 8.

In FIGS. 7(A) and 7(B), the optical waveguide module comprises a box or housing 13. Optical fibers with the coating 2 are secured to the wall of the box 13. An exposed fiber is placed in contact with and connected with an end face of the waveguide 5 on the substrate 4. This connection is carried out by inserting the exposed fibers into V-shaped grooves of the fiber holder 12 of silicon, fixing the fibers with an adhesive, and covering an upper surface of the holder 12 with a glass plate or similar parts (not shown). After polishing the end faces, the end faces of the fibers are aligned with the corresponding end faces of the waveguides and are then bonded with an adhesive.

FIGS. 8(A) and 8(B) illustrate a modification of the optical waveguide module of FIGS. 7(A) and 7(B). Here, the wall of the box 13 is used to secure the fiber holder 12, instead of securing the coated fibers.

These prior art waveguide modules, however, have problems to be solved, which problems arise when the box containing the waveguide substrate and securing optical fibers or fiber holders is subjected to an influence of external force or heat. When the box is deformed or distorted by an external force or expanded by heat, such undesirable changes in the box can directly affect the connection area of the waveguides and fibers. Namely, since a relative position of the end face of the fiber with regard to the end face of the waveguide is slightly shifted, the light coupling efficiency of the fiber to the waveguide is reduced, and in the worst case, defects such as a separation of the end face of the fiber from that of the waveguide and the like occur.

In the production of optical devices such as optical waveguide modules, optical fibers are generally not used alone but in combination as an array. This is because two or more optical fibers are necessary to satisfy the requirements concerning an increased amount of information to be transmitted. The fiber holders having an array of two or more optical fibers secured therein have been produced in accordance with the manner previously described with reference to the production of the waveguide modules and the manner described hereinafter with reference to FIGS. 9(A) to 9(D), for example.

The production of the fiber holder will be now described with reference to FIGS. 9(A) to 9(D): At this time, silicon (Si) substrates are conventionally used as a material of the fiber holder because they can be anisotropically etched to form V-shaped grooves on the surface thereof. Namely, as is well known in the field of semiconductor devices, when the Si single cystals are etched with a heated alkali etchant, anisotropical etching is attained because they show different etching rates depending upon the direction of crystalline faces thereof. For example, when the Si single crystal is etched in the above manner, (100) and (110) faces of the crystal are rapidly etched, but the crystal having (111) face is etched very slowly. Based on these characteristics of the Si single crystals, V-grooved Si substrates can be easily produced.

First, as shown in FIG. 9(A), parallel V-grooves 15 are formed on an upper surface of the Si substrate 14. While not illustrated herein, a wafer of Si single crystal having a specific crystal structure is prepared and a mask pattern of silicon oxide ($SiO_2$) coating is formed on the upper surface of the Si wafer. The mask pattern covers areas other than those in which the V-grooves are etched in the subsequent step. The masked wafer is then dipped in an alkali etchant to form a plurality of parallel fine V-grooves. After removal of the $SiO_2$ mask, the illustrated Si substrate 14 with parallel V-grooves 15 can be obtained.

Second, as shown in FIG. 9(B), optical fibers 1 from which the protective vinyl coating has been removed are placed in each of the V-grooves 15 of the substrate 14 and an epoxy-type adhesive 16 is coated to fill the gaps between the V-grooves 15 and fibers 1 and to cover the fibers 1 on the substrate 14.

After application of the adhesive, the fibers-containing substrate 14 is covered with another V-grooved Si substrate 17 as in FIG. 9(C), and the adhesive then allowed to harden. In this stage, as illustrated, the fibers 1 protruding from an end face of the bonded substrates 14 and 17 may have different lengths.

Next, the substrates 14 and 17 are laterally cut at a predetermined distance from the end face thereof (see lines b-b' of FIG. 9(C)). This cutting is made in a direction perpendicular to the fibers 1 in the V-grooves 15. The newly exposed end face of the substrates 14 and 17 is then polished to obtain the fiber holder shown in FIG. 9(D).

The resulting fiber holder with fiber array is shown in a longitudinal cross section in FIG. 10. The optical fiber 1 consists of a core 7 and a cladding 8 and is bonded through a coating of the adhesive 16 to the Si substrates 14 and 17. An end face of the fiber holder indicated with an arrow (a) has a planar surface.

The fiber holder of FIG. 10 can be attached to a waveguide as shown in FIG. 11. The waveguide used herein consists of an $LiNbO_3$ substrate 4 with a Ti:$LiNbO_3$ waveguide 5 and an $LiNbO_3$ block 6. An end face of the waveguide also has a planar surface. After alignment of the position of the core 7 of the fiber 1 with that of the waveguide 5, a UV-hardenable epoxy-type adhesive 18 is coated around the bonding interface between the fiber holder and the waveguide. Finally, UV rays are irradiated to harden the adhesive 18 and complete an integral bonding of the holder and waveguide.

However, there are some drawbacks in this and other prior art fiber holders, one of which drawbacks is an increase of the connection loss occurring as a result of a formation of fine gaps between the core of the fiber and the waveguide when a polished end face of the fiber holder and/or that of the waveguide are inclined or they are bonded with an inclination therebetween. For example, if either the holder or the waveguide has an end face inclined at an angle of 1°, a gap of several tens of micrometers will be formed between the core of the fiber and the waveguide. Further, in order to avoid a rapid increase of the connection loss, it is necessary to limit the level of the mismatching between the core of the optical fiber and the waveguide to 0.5 μm and less when both the core and the waveguide have a diameter of about 10 μm. Accordingly, when the fiber holder is attached to the waveguide in accordance with the prior art methods, connection and alignment operations must be carried out using mechanical means such as fine adjustment dials and the like, which make said operations cumbersome and expensive. Therefore, an improved fiber holder containing fibers in array is desired.

As described above, in the prior art, connection of the optical fiber to the waveguide is generally carried out by, as illustrated in FIG. 12, aligning a core 7 of the fiber 1 with a waveguide 5 and securing them with an adhesive 3. For this illustrated instance, assuming that both the waveguide substrate 4 and the block 6 are made from $LiNbO_3$, the waveguide 5 from Ti-diffused $LiNbO_3$ and both the core 7 and the cladding 8 from quartz ($SiO_2$), since there is a large difference in the refractive index between the Ti:$LiNbO_3$ waveguide 5 and the $SiO_2$ core 7, light $l_1$ transmitted through the core 7 is partially reflected at an end face of the waveguide 5 and returned when it enters the waveguide 5. The returning light is indicated by the dotted line $l_2$. Such partial reflection of the incident light $l_1$ must be prevented, for the following reasons.

In a typical optical communication system such as that of FIG. 32, for example, the system comprises a DFB-type semiconductor laser 19 and a waveguide-type optical modulator 20 in which the waveguide is made from Ti:$LiNbO_3$. Laser beams from the laser 19 are transmitted through the $SiO_2$ fiber 21 to the modulator 20. After modulation, the beams are transmitted through the $SiO_2$ fiber 22 to the next device (not shown). As in the case of FIG. 12, incident laser beams on the modulator 20 are partially reflected at an interface between the end face of the waveguide of the modulator 20 and that of the fiber 21. The reflected beams then return to and adversely affect the laser 19, thereby causing variations in the characteristics of the laser.

In the prior art system, in order to inhibit this return of the laser beams to the laser, conventionally an isolator is disposed between the laser 19 and the modulator 20. However, if the returning beams are notably increased, it is necessary to use a high quality isolator, and this means an increase of the costs of the resulting optical communication system. Alternatively, in order to reduce the degree of return of the incident laser beams, it was proposed to apply an anti-reflection coating onto an end face of the waveguide. However, this coating technique is not satisfactory in regard to the control of the thickness of the resulting coating, in addition to resulting in an increase of the steps necessary to produce the devices, and accordingly, an increase of the production costs. In view of these disadvantages, it is desired to provide an improved connection method for optical fibers which can prevent or reduce reflection of the beam incident onto the waveguide without complicating the system.

SUMMARY OF THE INVENTION

According to the present invention, there is provided a method of connecting optical fibers to each other by butting and adhering, in which each of the optical fibers has a connection aid having a hole into which the fiber is inserted and secured and from which hole a tip portion of the fiber slightly protrudes, and an adhesive is applied to a gap between the two adjacent connection aids.

According to the present invention, there is also provided a method of connecting optical fibers to optical waveguides by butting and adhering, in which the optical fiber has a connection aid having a hole into which the fiber is inserted and secured and from which hole a tip portion of the fiber slightly protrudes, and an adhesive is applied to a gap between an end surface of the waveguide substrate and an opposed end surface of the connection aid.

Further, according to the present invention, there is provided a module of an optical waveguide in which a wall of the box of the module has a coated optical fiber secured therein, a top surface of the fiber is connected with an end surface of the waveguide placed in the box, and the fiber in the box is stripped to expose the cladding thereof and is deformably curved.

Furthermore, according to the present invention, there is provided a fiber holder which comprises a substrate having secured therein an array of two or more parallel optical fibers, a tip portion of each of the fibers slightly protruding at the same length from the end face of the substrate.

BRIEF DESCRIPTION OF DRAWINGS

FIGS. 28(A), 28(B), 28(C), 29(D), and 28(E) illustrate in sequence the production of the fiber holder according to the present invention;

DESCRIPTION OF THE PREFERRED EMBODIMENTS

The present invention will be described hereinafter with reference to preferred embodiments thereof.

Figure 1:
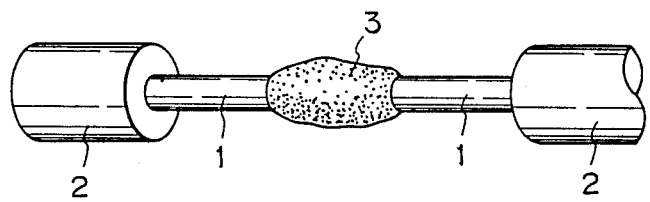
FIG. 1 is a perspective view illustrating connection of optical fibers according to the prior art method.
Figure 2:
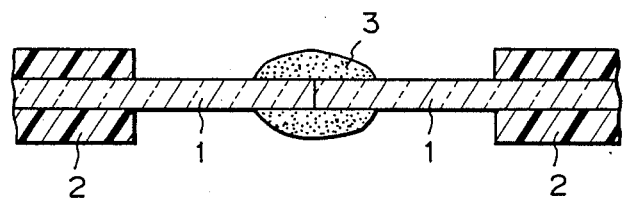
FIG. 2 is a cross-sectional view of the bonded optical fibers of FIG. 1.
Figure 3:
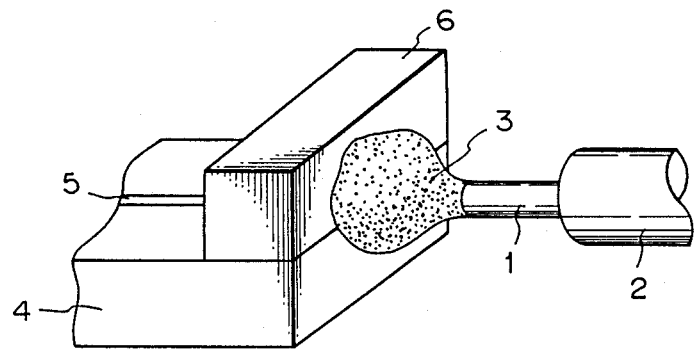
FIG. 3 is a perspective view showing prior art connection of the optical fiber to the waveguide using an adhesive.
Figure 4:
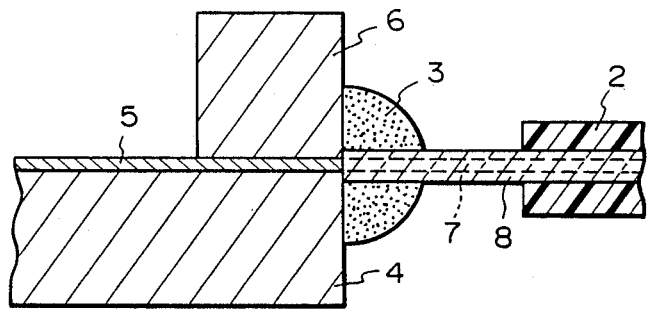
FIG. 4 is a cross-sectional view of the connected fiber and waveguide of FIG. 3.
Figure 5:
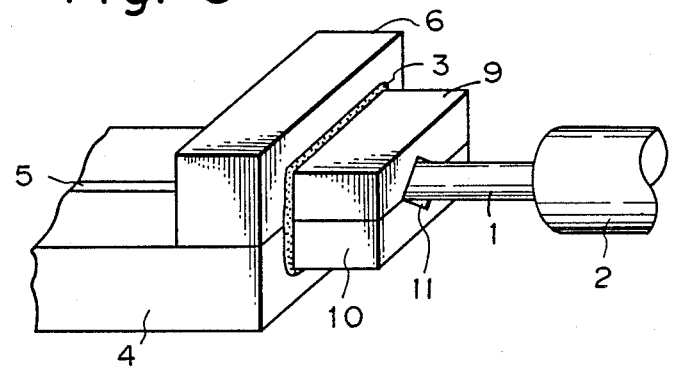
FIG. 5 is a perspective view showing prior art connection of the optical fiber to the waveguide using one set of V-grooved silicon substrate.
Figure 6:
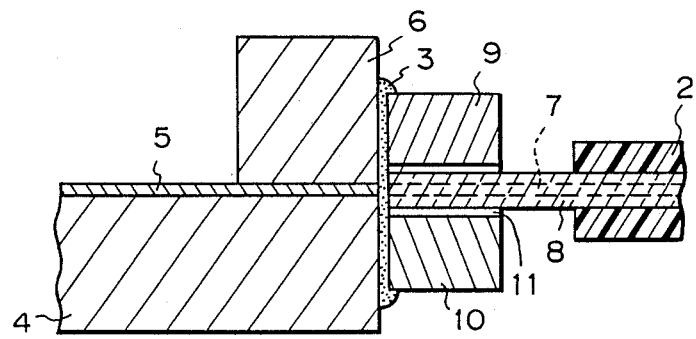
FIG. 6 is a cross-sectional view of the connected fiber and waveguide of FIG. 5.
Figure 7A:
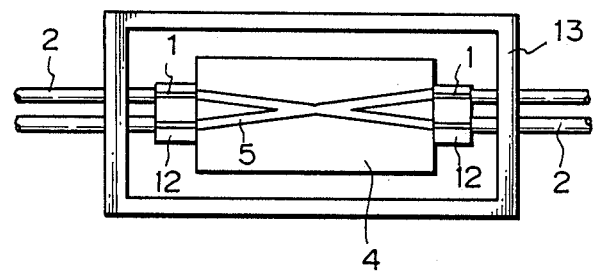
FIGS. 7(A) and 7(B) illustrate an example of the prior art waveguide modules.
Figure 7B:
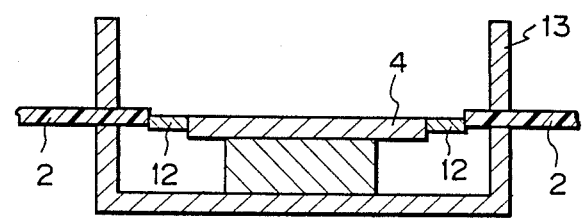
Figure 8A:
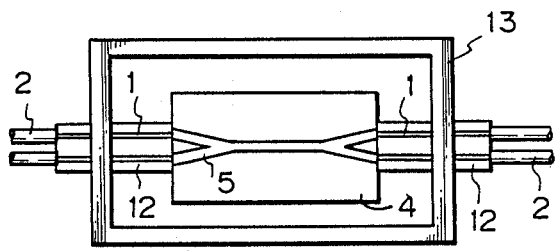
FIGS. 8(A) and 8(B) illustrate another example of the prior art waveguide modules.
Figure 8B:
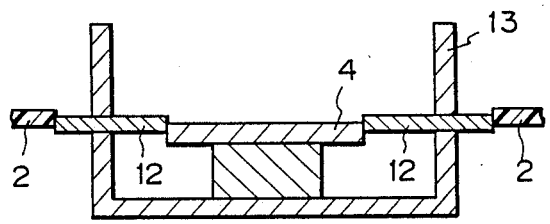
Figure 9A:
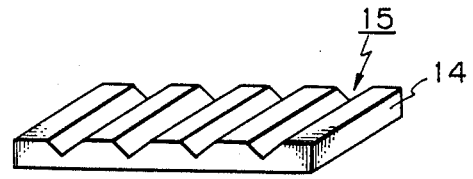
FIGS. 9(A) 9(B), 9(C) and 9(D) illustrate in sequence the production of the fiber holder according to the prior art method.
Figure 9B:
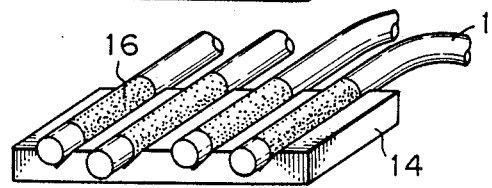
Figure 9C:
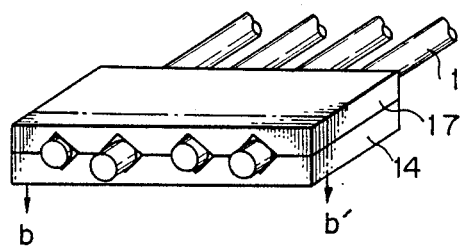
Figure 9D:
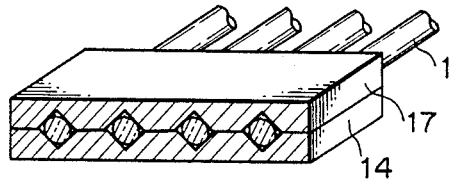
Figure 10:
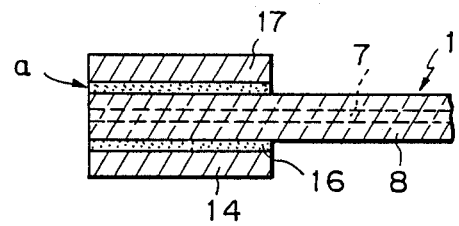
FIG. 10 is a longitudinal cross-sectional view of the fiber holder produced according to the method of FIGS. 9(A) to 9(D)
Figure 11:
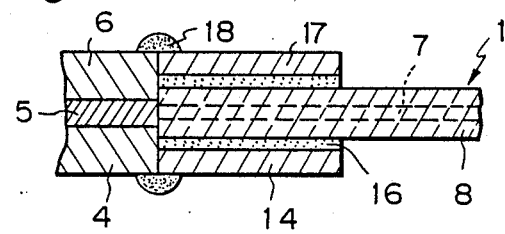
FIG. 11 is a longitudinal cross-sectional view showing the connection of the fiber holder of FIG. 10 to the optical waveguide.
Figure 12:
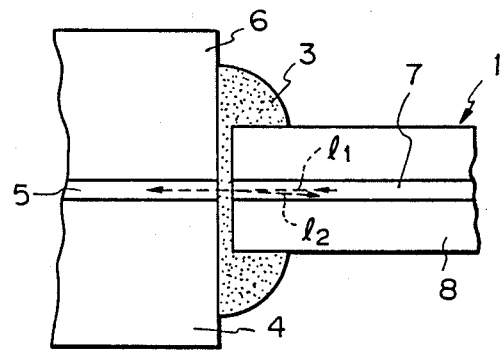
FIG. 12 is an illustration showing the reflection of light beams at an interface between the end surface of the core of the fiber and that of the waveguide.
Figure 13:
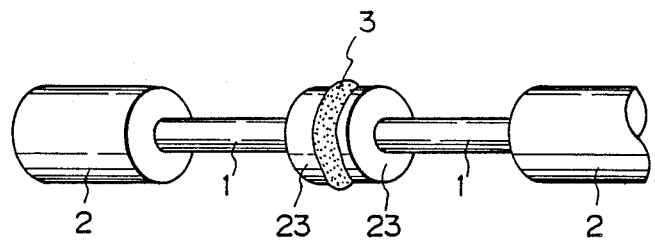
FIG. 13 is a perspective view illustrating connection of optical fibers according to the present invention.
Figure 14:
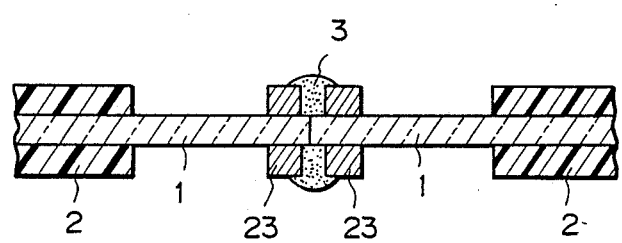
FIG. 14 is a cross-sectional view of the bonded optical fibers of FIG. 13.
Figure 15:
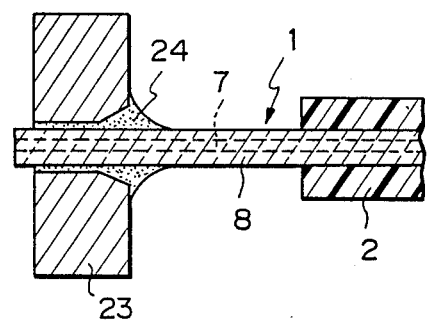
FIG. 15 is an enlarged cross-sectional view of the optical fiber with the connection aid used in the connection method of FIGS. 13 and 14.

The connection of optical fibers to each other according to the present invention is illustrated in FIG. 13 (perspective view) and FIG. 14 (cross-sectional view). The optical fiber 1 used herein, as shown in FIG. 15, has a connection aid 23, and the fiber 1 is stripped so that a vinyl coating 2 is removed from a top portion thereof. Thereafter, the tip portion of the fiber 1 is inserted in a hole of the connection aid 23. Insertion of the fiber 1 is stopped when the tip portion protrudes slightly, for example, 0.5 to 1 mm, from an end face of the aid 23, and then an adhesive 24 such as epoxy or acryl adhesives is applied to firmly secure the aid 23 to the fiber 1. The end face of the fiber 1 is thoroughly polished and cleaned.

The opposing faces of the two connection aid-secured fibers 1 are butted together and a gap between the two adjacent aids 23 is filled with an adhesive 3. The adhesive 3 applied is UV-hardenable and is hardened by irradiation of UV rays. The two optical fibers 1 are thus connected without loss and other defects, and the bonding strength of these fibers is notably high, because this connection is based on two bonding sites, i.e., a bonding between the fiber and connection aid and between the two bonding aids.

Figure 16:
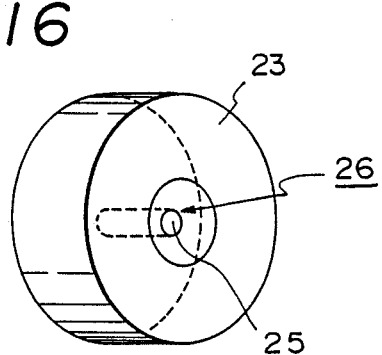
FIG. 16 is a perspective view of the ruby bead used as the connection aid in the present invention.

In this connection method, the connection aid used is a ruby bead shown in FIG. 16. The ruby bead is commercially available as a part for watches. Since the bead 23 has a depressed portion 26 which acts as a guide for the fiber tip, it is very easy to insert the fiber in the hole 25 of the bead 23. The ruby beads for watches generally have a diameter of 1.2 mm, a thickness of 40 $\mu$m, and a hole size of 130 $\mu$m. Other ruby beads having different sizes can be easily and economically produced from a rod of ruby, since the ruby has a high fabrication quality. The resulting ruby beads have a hole bored at an accuracy of less than +1 $\mu$m with regard to the optical fiber.

Although commercially available ruby beads used for the production of watches, are used as the connection aid in the practice of the present invention, because of the various merits thereof, it should not be limited thereto. The connection aids used may have any desired configuration and may be produced from any desired material. For example, the connection aids may be rectangular blocks. Further, the connection aids may be produced from lithium niobate, sapphire, glass, ceramics, plastics, and metals such as aluminum or copper. Lithium niobate is most preferable since the waveguide substrate is also made from lithium niobate. When the connection aids are made from a metal or have a metal coating deposited on the surface thereof, soldering can be advantageously carried out using suitable solder fluxes instead of the adhesives.

The hole size of the connection aids may be widely varied depending upon the specific diameter of the optical fiber less the coating, and a specific adhesive used. The hole size is generally in the range of about 50 $\mu$m to about 1.0 mm. The hole size of the connection aids can be adjusted to fit an outer diameter of the fiber as closely as possible, so that the insertion of the fiber into the hole of the connection aid will ensure that an end face of the aid is perpendicular to the axis of the fiber. For example, when the length of the hole is 500 $\mu$m and the hole size is 4 $\mu$m larger than the diameter of the fiber, an inclination angle of the end face of the connection aid with regard to a plane perpendicular to the fiber axis can be reduced to 0.5° or less.

Figure 17:
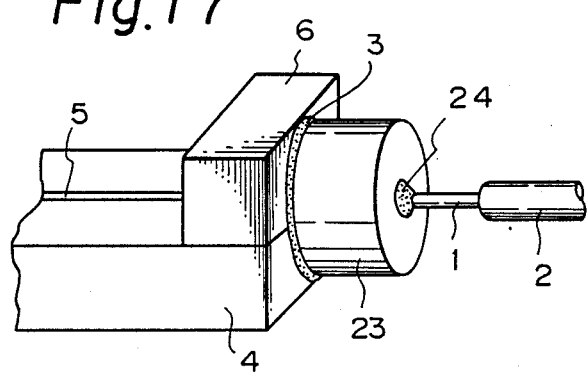
FIG. 17 is a perspective view showing connection of the optical fiber to the waveguide in accordance with the present invention.
Figure 18:
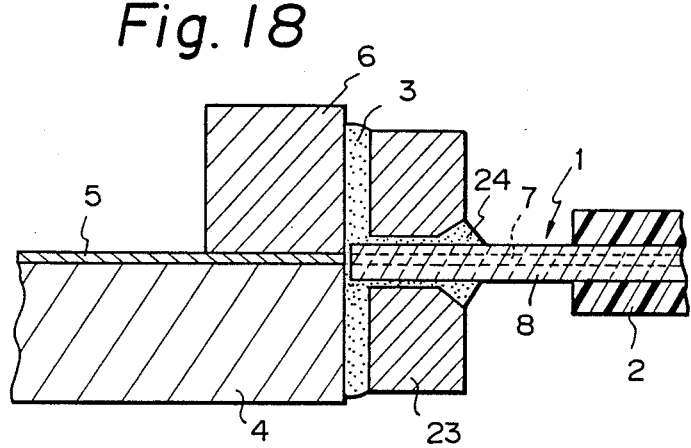
FIG. 18 is a cross-sectional view of the connected fiber and waveguide of FIG. 17.

Using the ruby bead described in the above paragraphs, the connection of the optical fiber to the optical waveguide according to the present invention can be carried out as illustrated in FIGS. 17 and 18. The optical fiber 1 consists of a core 7 and cladding 8 and a vinyl coating or covering 2. The vinyl coating 2 is removed from the top portion of the fiber 1 before insertion of the fiber 1 into the hole of the ruby bead 23. The top portion of the fiber 1 is then inserted into the hole of the bead 23 to a predetermined depth and bonded with an adhesive 24. Adhesives for thermal bonding are preferably used. The fiber tip protrudes slightly from the bead face. A small amount of UV-curable adhesive 3 is then applied to the bead face. After the fiber tip is aligned with the end face of the waveguide 5 in such a manner that the connection loss is minimized, the adhesive 3 is cured by irradiation with UV rays. Thus, the illustrated device in which the fiber 1 is directly and strongly bonded to the waveguide 5 with a very low excess loss can be obtained. A satisfactory matching of the end face of the fiber 1 with that of the waveguide 5 can be also attained, because the ruby bead 23 used is small and has a low weight. Accordingly, in the connection method according to the present invention, the connection loss in the device is almost zero.

The top surface of the waveguide substrate 4 has a block 6 made of the same or different material as that of the substrate 4 so that the bonding area of the end face of the waveguide 4 is larger than that of the end face of the ruby bead 23. This ensures a stronger connection between the substrate 4 and the bead 23. If an increase of the connection strength between the substrate and bead is desired, this can be realized by increasing the bonding area of both the substrate and bead and/or increasing the thickness of the bead.

Figure 19:
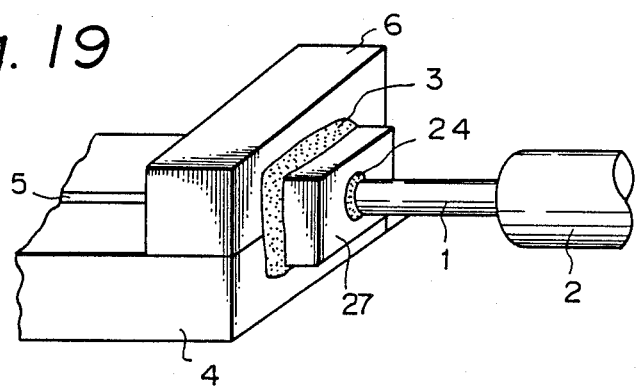
FIG. 19 is a perspective view showing another connection of the optical fiber to the waveguide in accordance with the present invention.

In addition to the ruby beads, other types of connection aids can be used in the present invention. For example, similar results can be obtained if a rectangular ceramic block 27 as shown in FIG. 19 is used as the connection aid instead of the ruby bead. In FIG. 19, the same reference numerals mean the same parts or elements as shown in FIG. 17.

From these two examples, it will be appreciated that, when the fiber tip is attached to the end face of the waveguide according to the present invention, an unexpectedly large bonding strength between the fiber tip and waveguide, an easy, prompt and correct alignment of the fiber top with the waveguide, and a reduced loss of light as well as reduced and stabilized loss change can be concurrently realized.

To demonstrate the superior effects of the present invention, the following experiments were carried out:

Temperature dependency of loss change

A Ti-diffused waveguide on a z-cut $LiNbO_3$ substrate was prepared and used. The waveguide was fabricated by linearly diffusing Ti at a 700Å thickness and a 7 $\mu$m width for 8 hours at 1050° C. in a wet $O_2$ atmosphere to produce a single-mode Ti+LiNbO$_3$ waveguide where λ=1.3 μm. Both ends of the waveguide were polished after small LiNbO$_3$ blocks were laid on surfaces of the substrate at both ends of the waveguide. The LiNbO$_3$ blocks were secured on the waveguide substrate using a commercially available thermosetting epoxy adhesive. The length of the Ti =LiNbO$_3$ waveguide was 20 mm.

Figure 20:
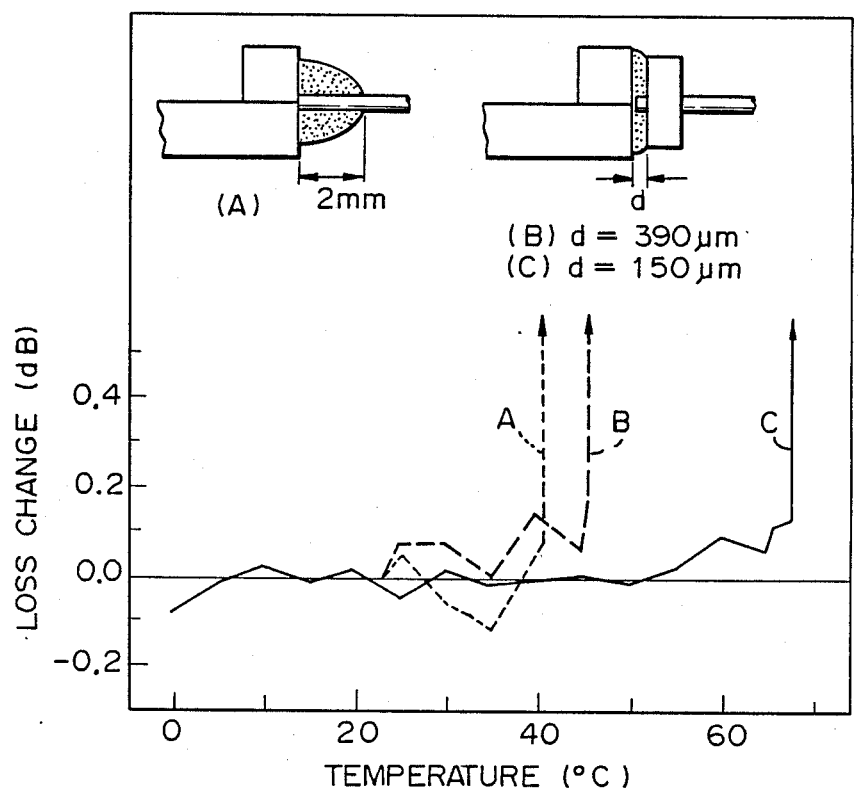
FIG. 20 is a graph showing the relationship between the temperature and loss change under different conditions.

Two samples (B) and (C) according to the present invention as shown in FIG. 20 were prepared. A protrusion length (d) of the fiber tip or distance between the end face of the waveguide and that of the connection aid (as described hereinafter, the connection aid was a ruby bead) was d 390 μm for the sample (B), and d =150 μm for example (C). The ruby bead used as the connection aid was commercially available as a watch bearing. The ruby bead had an outside diameter of 1 mm, a thickness of 0.45 mm, and a hole size of the 0.13 mm. The optical fibers used were a polarization-maintaining input fiber and a single-mode output fiber. A thermosetting epoxy resin was used to fix the ruby bead to a top portion of each of the fibers.

After the ruby bead was fixed, the fibers were carefully aligned with the waveguide so that the TM mode insertion loss was minimal, and then were bonded using a UV-curable adhesive.

For sample (B), the insertion loss from the input fiber to the output fiber was determined to be 1.6 dB. The excess loss caused by the shrinkage of the adhesive during UV curing was less than 0.1 dB per connection. Next, the vinyl-coated portion of the fibers was clamped to the wall of the package of the waveguide substrate. No excess loss occurred as a result of this clamping. The loss change of the sample due to an increase of the temperature was then examined. As shown by the chain line (B) in FIG. 20, the maximum loss change in the range of from 23 to 45° C. was 0.2 dB, but at 46° C., the loss was abruptly increased. Then, in order to ascertain the bonding strength of the fiber to the waveguide, the fiber was pulled from the waveguide to apply strain to the joining portions. The fiber broke at a load of 500 gwt, but did not separate from the waveguide.

For comparison, sample (A) was prepared without using a ruby bead. As shown, this sample was prepared by bonding a tip portion of the fiber to the waveguide by using a mass of the adhesive. The fiber top (2 mm) was filled with the adhesive. As shown by the dotted line (A) in FIG. 20, the maximum loss change from 23° C. to 40° C. was 0.19 dB, and the loss was abruptly increased at 41° C. Further, in the bonding strength test, the fiber separated from the waveguide at a load of 100 gwt.

Based on the above results, an investigation was made into the reason why the loss abruptly increased, and as a result, it was found that the amount of the adhesive between the end faces of the ruby bead and waveguide substrate was much larger than that between the end faces of the fiber and waveguide and, therefore, there were remarkable differences in thermal expansion between the above two portions, i.e., bead-waveguide substrate and fiber-waveguide, such that strain was generated between the end faces of the fiber and waveguide when the temperature rises, and that when the strain exceeded the strength of the UV-curable adhesive used, the fiber separated from the waveguide. It was also found that the breakdown temperature was increased when the amount of the UV-curable adhesive applied was reduced by shortening the length of the fiber tip protruding from the ruby bead. In sample (C), in which the length of the fiber protruding from the bead is 150 μm, the loss change due to the temperature, which is shown by the solid line (C) in FIG. 20, was obtained. The maximum loss change from 0° C. to 67° C. was 0.2 dB, with a breakdown at 68° C. Further, while not plotted in FIG. 20, when the gap or length (d) of the fiber tip protruding from the bead was reduced to 50 μm, the maximum loss change similar to that of the sample (C) was obtained, with a breakdown at 110° C. It thus became apparent that the breakdown temperature should increase if the gap is made smaller.

Temperature cycle test

Figure 21:
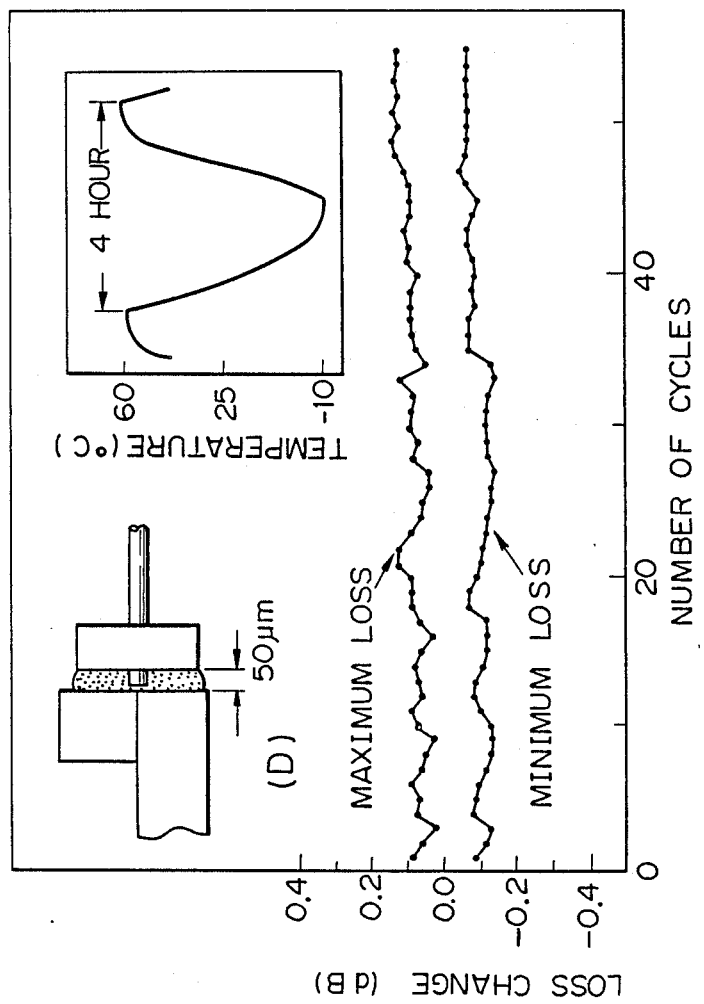
FIG. 21 is a graph showing the relationship between the number of cycles and loss change for the connection method according to the present invention.

FIG. 21 shows the results of the temperature cycle test in which heating was periodically repeated in the pattern plotted in the right upper portion of the graph. The sample tested was the same as that used in the previous test (gap d =50 μm), and is herein referred to as sample (D). The graph indicates that for the present invention, the loss change was diminished and stably maintained.

Tension test

Figure 22:
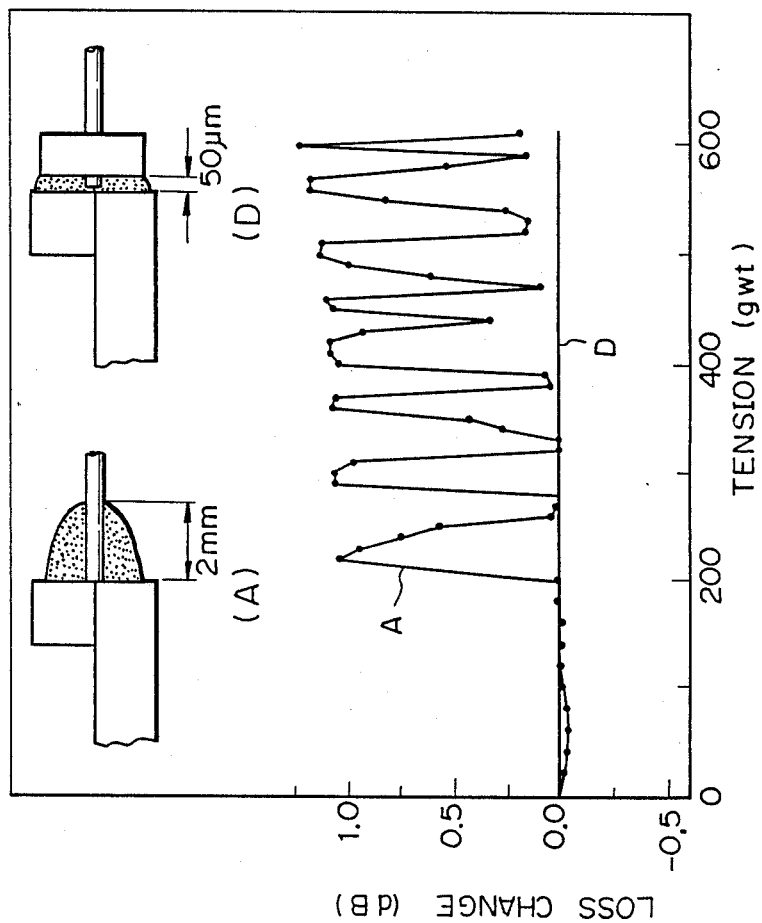
FIG. 22 is a graph showing the relationship between the tension and loss change for the prior art connection method and the connection method according to the present invention.

The above samples (A) and (D) were subjected to tension tests, and the results are plotted in FIG. 22. The graph of FIG. 22 indicates that, while the sample (D) according to the present invention did not suffer a loss change, the prior art sample (A) suffered a remarkable change in loss when the tension was increased to 200 gwt and more. Such a variation in the loss change means that the prior art sample can not be used in practical devices, since it is not reliable.

Preferred range of the protruded fiber tip

Figure 23:
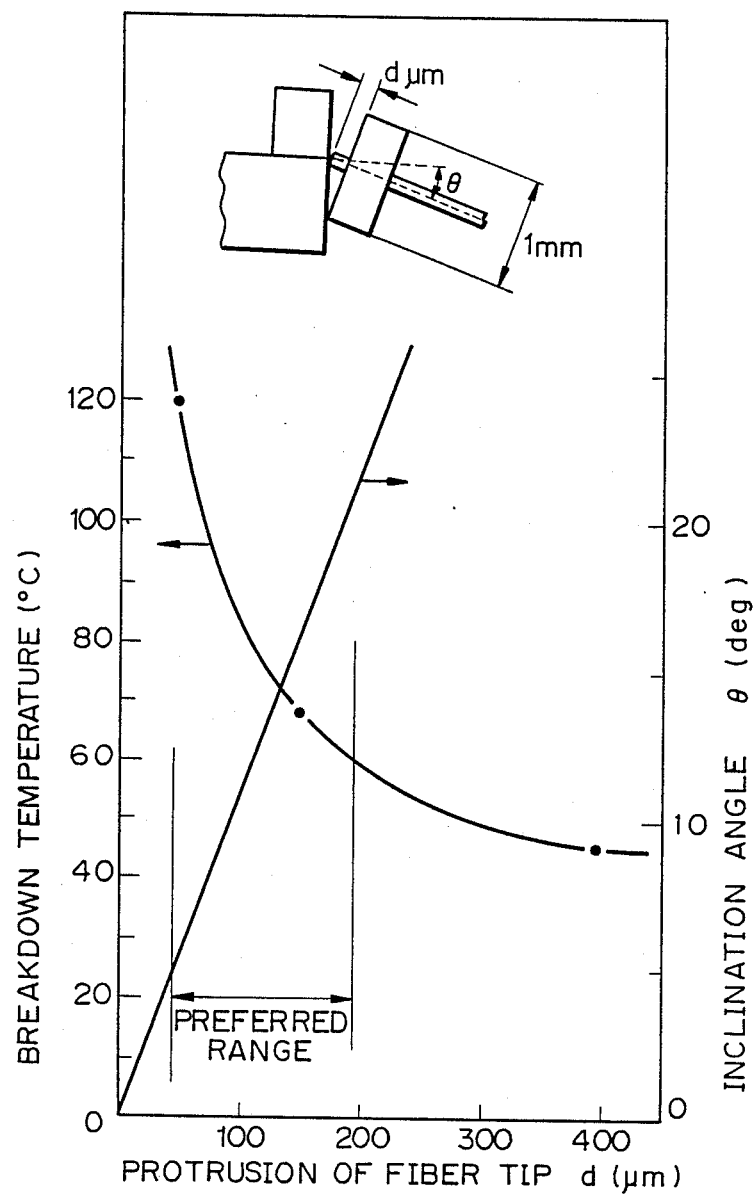
FIG. 23 is a graph showing the relationship between the prutrusion length of the tip portion of the fiber, inclination angle of the fiber and breakdown temperature.

In order to ascertain a preferred range of the protrusion of the fiber tip from the ruby bead, different samples according to the present invention, which were prepared in a manner similar to the preparation of the above samples (B), (C) and (D), were tested and a graph concerning the relationship between the length of the fiber tip which protrudes from the ruby bead, and the inclination angle and breakdown temperature (see FIG. 23) was obtained. The graph of FIG. 23 indicates that since the breakdown temperature was 60° C. or more, the length of the fiber tip which protrudes was preferably 200 μm or less, and that the inclination angle was 5° or more in view of the alignment, and accordingly, the length of the protruding fiber tip was preferably at least about 50 μm. Namely, a preferred range of the length of the fiber tip protruding from the end face of the ruby bead and/or other connection aids was from about 50 to 200 μm.

The excellent effects of the present invention will be appreciated from the above descriptions concerning the connection of optical fibers with each other or the connection of an optical fiber with a waveguide. These effects can be also attained in an improved waveguide module according to the present invention. In addition, in the present waveguide modules, additional effects such as prevention of an adverse affect of external force and heat onto the box or casing of the module and accordingly, on the connection between the waveguide and fiber, can be also attained.

Figure 24:
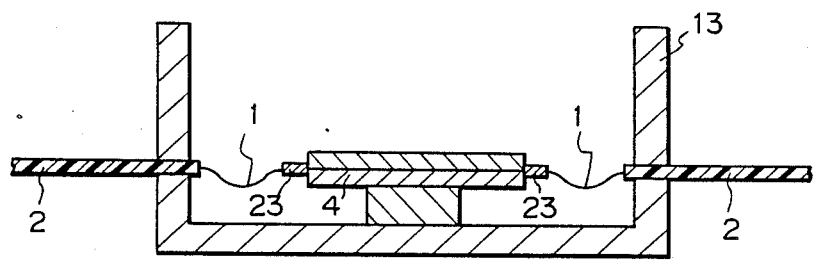
FIG. 24 is a cross-sectional view of the waveguide module according to the present invention.

FIG. 24 is a cross-sectional view of a typical waveguide module according to the present invention. In the illustrated waveguide module, a box or casing 13 of stainless steel has a waveguide substrate (LiNbO$_3$) 4 placed in a center portion thereof, and coated fibers 2 secured to the wall thereof. Each optical fiber 1 is connected through the connection aid (ruby bead in this example) 23 according to the present invention, to the waveguide (not shown: Ti = LiNbO$_3$) on the LiNbO$_3$ substrate 4.

As apparent from FIG. 24, the stripped fiber 1 is deformably curved in the box 13 of the module. This curvature is preferably controlled to the extent at which deformation or expansion of the box does not directly affect the connection area of the waveguide and fiber. Excess curvature must be avoided, because it tends to cause the fiber to break. Further, stripping of the vinyl coating from the fiber is desirably carried out, for example, by burning the coating, after the fiber with the coating is curved to a desired configuration. This effectively avoids breaking of the fiber which frequently occurs when the fiber is curved after the coating is stripped off.

In the waveguide module of FIG. 24, the optical fiber was connected to the waveguide by using the ruby beads as the connection aid. However, if appropriate, a conventional U-groove method and V-grooved Si substrate may be used as the connection aid instead of the ruby beads.

From FIG. 24 and the description thereof, it will be understood that according to the present invention, the problem of a reduction of the efficiency of the light connection due to relative movement between the fiber and waveguide and resulting change in the relative positions thereof can be completely solved, because even if an external force or heat is applied to the module box, such force or heat is not transmitted to the interconnected portions of the waveguide and fiber. Additionally, many advantages can be attained if the ruby beads or other means within the scope of the present invention are used as the connection aids, as already described.

Figure 25:
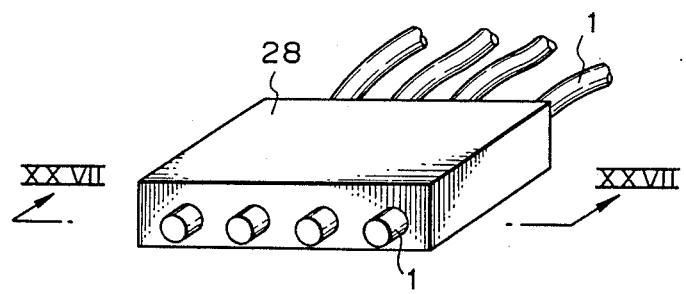
FIG. 25 is a perspective view of the fiber holder according to the present invention.
Figure 26:
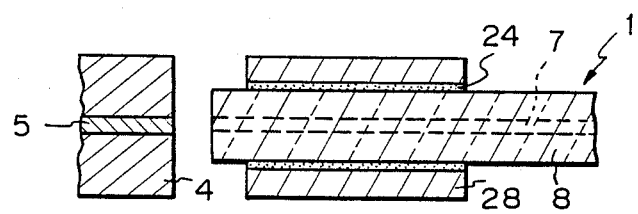
FIG. 26 is a cross-sectional view showing connection of the fiber holder of FIG. 25 to the waveguide.

FIG. 25 is a perspective view of the connection aid according to the present invention which contains an array of optical fibers and is referred herein to as a fiber holder. The fiber holder 25, as illustrated in FIG. 25, contains an array of four fibers 1 secured in the body thereof. Each of these fibers has the same length protrusion from the end face of the holder. These protrusions are formed through etching of the holder. As shown in the cross-sectional view of FIG. 26, the fiber 1 consists of a core 7 and a cladding 8, and the core 7 is connected with the waveguide 5 on the substrate 4 upon alignment and bonding. The end faces of both of the fiber and waveguide are polished to afford a satisfactory connection. If necessary, these end faces can be checked with the naked eye, using microscopes or other devices, prior to the alignment and bonding operation. Bonding can be carried out by using UV curable adhesives as previously described.

Using the fiber holder according to the present invention, when the polished end faces of the fibers are connected to the waveguides, since the contact area of each corresponding fiber and waveguide is largely reduced, even if the polished end face of the holder is inclined, it does not come into contact with the waveguide, and no gap is formed between the waveguide and the core of the fiber conversely even if a gap is formed or there is a dislocation in position between the waveguide and the core of the fiber, such defects can be easily controlled and corrected through a naked eye observation of the connection area in the lateral direction to the axis of the fiber. Further, since the fiber tips are caused to protrude from the fiber holder through selective etching of the end face of the holder, the protrusion length of the fiber tip can be controlled with a good reproducibility through control of the etching time and the like. This control of the protrusion length of the fiber is particularly effective for stabilizing the temperature characteristics of the resulting connection. Accordingly, in the connection of the fiber holder to the waveguide, connections having no transmission loss and having stable characteristics can be produced by fewer steps in the production thereof than required in prior art methods.

The fiber holder of FIG. 25 can be produced, for example, in the manner described in the sequence in FIGS. 27(A) to 27(D) which are cross-sectional views along with line XXVII—XXVII of FIG. 25.

Figure 27A:
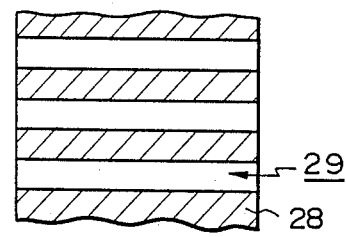
FIGS. 27(A), 27(B), 27(C), and 27(D) illustrate in sequence the production of the fiber holder of FIG. 25.
Figure 27B:
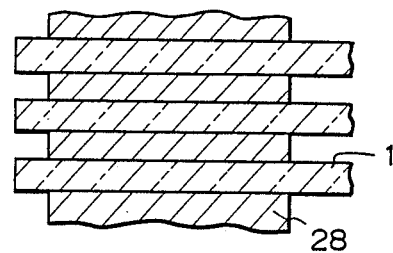
Figure 27C:
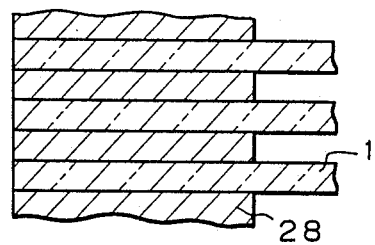
Figure 27D:
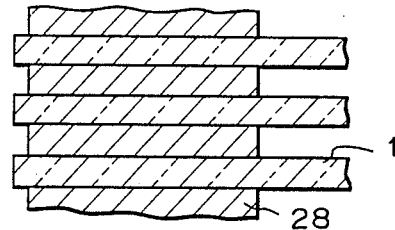

First, as shown in FIG. 27(A), the holder material 28 having holes 29 corresponding an array of optical fibers to be inserted is prepared. For example, in the production of the holder made from metal, a melt of the metal is poured into a mold containing rods corresponding to the fibers. After hardening of the melt, the rods are removed from the holder material 28. The removal of the rods can be easily carried out if the rods are resist materials. Fibers 1 are then inserted into each of the holes of the holder material (see FIG. 27(B)). The inserted fibers 1 are then arranged so that their end faces and a end face of the holder material 28 are on the same plane (see FIG. 27(C)). This can be attained, for example, by pressing the end face of the holder material 28 against a flat plate (not shown). Finally, as in FIG. 27(D), the end face of the holder material 28 is etched to a predetermined depth so that the top portion of each fiber 1 protrudes slightly from the end face of the holder 28. In this step, the holder material can be etched by conventional etching techniques.

Similarly, another type of fiber holder can be produced in the manner illustrated in the sequence of FIGS. 28(A) to 28(E). In these drawings, FIGS. 28(A) to 28(D) correspond to FIGS. 9(A) to 9(D), respectively, and therefore, are not described herein to avoid duplication.

Figure 28A:
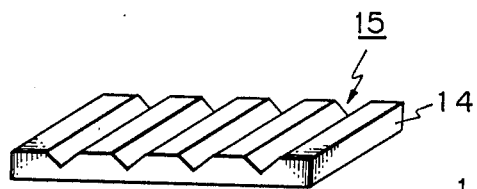
Figure 28B:
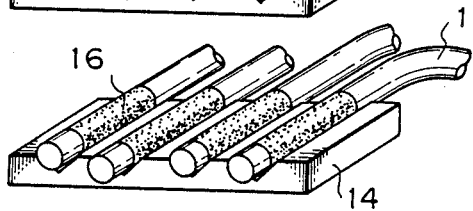
Figure 28C:
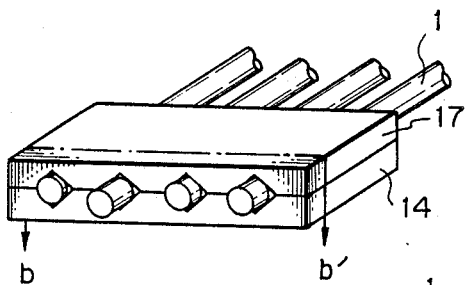
Figure 28D:
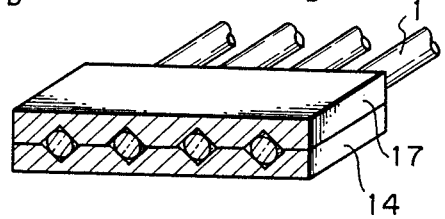
Figure 28E:
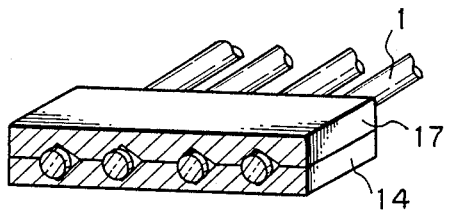

After the completion of step (D), the resulting fiber holder is dipped in an etchant solution and the polished surface thereof is etched under predetermined conditions. Since the holder is made from the V-grooved Si substrates, etchants capable of selectively etching off the Si crystals only, for example, pyrocatechols and the like, can be used in this etching step. The etching depth is about ten to several hundreds of micrometers. The resulting fiber holder according to the present invention is shown in FIG. 28(E). As a result of the addition of a selective etching step to the prior art production process for the fiber holders, improved fiber holders can be obtained.

As described above, the depth of selective etching for the Si substrates is preferably about ten to several hundreds of micrometers. This depth is defined to avoid separation of the fiber tip from the end face of the waveguide which frequently occurs at a high temperature as a result of large differences in the respective thermal expansion coefficients of the optical fiber and the UV-curable epoxy adhesive used for bonding the waveguide substrate and fiber holder.

When pyrocatechols are used as the etchant in the selective etching step, they can not remove SiO$_2$ coatings on the Si substrates (SiO$_2$ coatings act as a stabilizing medium for the substrates) and the epoxy adhesives used. However, since the $SiO_2$ coatings are very thin, they will be separated and removed during the etching step. Even if the epoxy adhesives remain, they will not cause additional problems, because the amount thereof is very small and they and the UV-curable adhesives also used are classified under the same epoxy resin group.

The fiber holders according to the present invention, when used in the connection of the optical fibers to the waveguide in optical communication devices, can ease and ensure such a connection without lowering the transmission characteristics of the devices. Of course, in the practice of the present invention, any materials can be used as the holder material in addition to the Si substrates, insofar as they can be fabricated and selectively etched as in the case of the Si substrates.

According to the present invention, the tip portion of the optical fiber can be fabricated with a rounded surface, a tapered surface, and a cleaved cladding end. These top surfaces of the fiber effectively avoid undesirable contact of the tip portion of the fiber with the end face of the waveguide substrate. Therefore, correct matching of the end face of the fiber and that of the waveguide can be attained without an increase of the light insertion loss. According to the present invention, an end surface of the waveguide and waveguide substrate can be inclined at a predetermined angle from the direction perpendicular to the longitudinal axis of the waveguide. This inclined end face of the waveguide effectively prevents a return of the reflected light in the same direction as that of the incident light. Such reflected and returned light in the input optical fibers is therefore reduced or eliminated. These inventions will be further described with reference to FIGS. 29 and 30.

Figure 29:
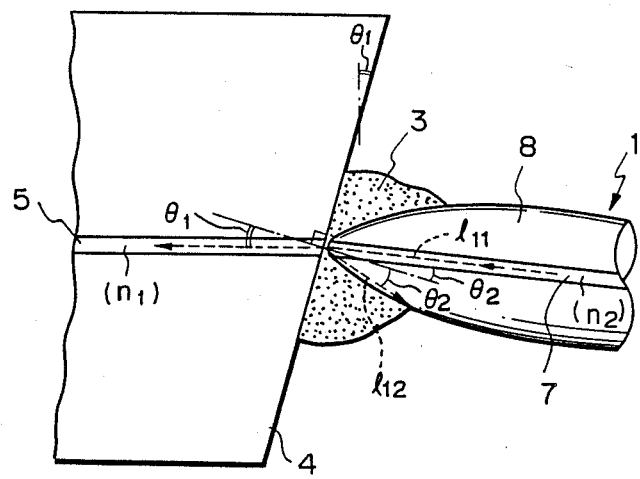
FIG. 29 is an illustration showing prevention of the return of the incident light beams according to the present invention.

FIG. 29 illustrates a tapered tip surface of the optical fiber. The $LiNbO_3$ waveguide substrate 4 has a Ti-diffused $LiNbO_3$ waveguide 5. An end face of the substrate 4 is inclined at an angle $\theta_1$ (for example 2° or more) relative to the direction perpendicular to the direction of the waveguide 5. Further, a tip portion of optical fiber 1, such as quartz fiber is tapered to form a rounded surface. Such tapering can be easily realized by conventional etching technologies. Furthermore, since the refractive index $n_1$ of the waveguide 5 is larger than the refractive index $n_2$ of the core 7 of the fiber 1 (for example, $n_1 = 2.2$, $n_2 = 1.45$), and refraction of the light occurs at the end face of the waveguide 5, the fiber 1 is aligned with the inclination at an angle $\theta_2$ ($<\theta_1$) with regard to the normal to the end face of the waveguide 5. While maintaining this contact of the fiber and waveguide, the tip portion of the fiber 1 and the end face of the waveguide substrate 4 are then bonded using an adhesive 3 having a refractive index similar to that of the fiber 1, for example, UV-curable epoxy adhesives. The adhesive 3 used will also bond the end face of the waveguide substrate 4 and the connection aid (not shown), and thus an integrally bonded fiber and waveguide structure is obtained.

In the structure of FIG. 29, light $l_{11}$ transmitted through the core 7 of the fiber 1 is guided into the end face of the waveguide 5 at an incident angle $\theta_2$. After refraction at a refraction angle $\theta_1$, it is then transmitted through the waveguide 5. When the light $l_{11}$ is introduced into the end face of the waveguide 5, the reflected light $l_{12}$ is produced. The light $l_{12}$, as illustrated in FIG. 29, is reflected at an angle $2 \times \theta_2$ with regard to the direction of the incident light $l_{11}$. Namely, the reflected light $l_{12}$ is reflected out of the fiber 1, or if reflected within the area of the core 7 of the fiber 1, is immediately decayed due to a large incident angle of $2\theta_1$. Accordingly, the return of the reflected light $l_{12}$ to the core 7 of the fiber 1 can be prevented. Similar results can be also obtained when the light is transmitted from the waveguide 5 to the core 7 of the fiber 1, because the normal of the end face of the waveguide substrate 4 is inclined at an angle $\theta_1$ with regard to the waveguide 5.

According to the present invention, since the return of the reflected lights is remarkably reduced, it is not necessary to use the high performance isolators essential to the prior art optical communication systems. Further, as a result of the inclination of the end face of the waveguide substrate, it becomes unnecessary to apply an anti-reflection coating to the end face of the waveguide substrate, and thus the cost of the devices are reduced. Furthermore, during the alignment of the fiber with the waveguide, the tip portion of the fiber does not come into contact with the end face of the waveguide substrate, and therefore, the correct alignment can be attained without an increase of the light insertion loss.

The inclination angle of the end face of the waveguide substrate is desirably 2° or more, although a lesser angle also effectively reduces the return of the reflected light. The inclination angle $\theta_2$ of the optical fiber is desirably controlled so that the transmitted light is connected with a low loss, depending upon the inclination angle $\theta_1$ and the refractive indexes $n_1$ and $n_2$.

Figure 30:
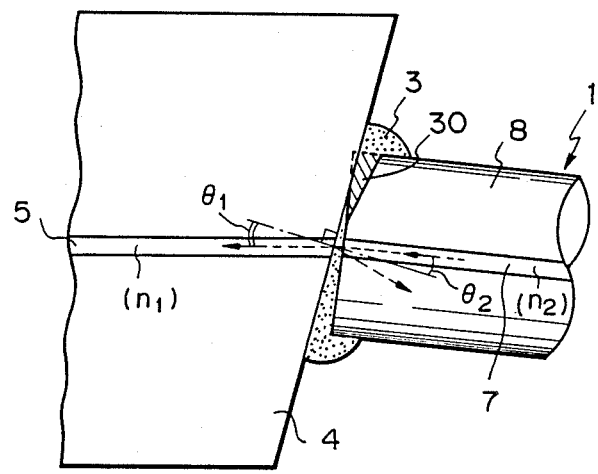
FIG. 30 is another illustration showing prevention of the return of the incident light beams according to the present invention.

FIG. 30 illustrates the optical fiber 1 in which a top end portion of the cladding 8 is cleaved (see reference number 30). The cleaved face of the cladding 8 is polished. Results comparable to those of the structure of FIG. 29 can be obtained.

The connection method according to the present invention can be applied to the production of various optical devices such as intensity modulators, phase modulators, polarizing wave controllers, optical switches, optical wave separators, optical taps and optical sensors.

Figure 31:
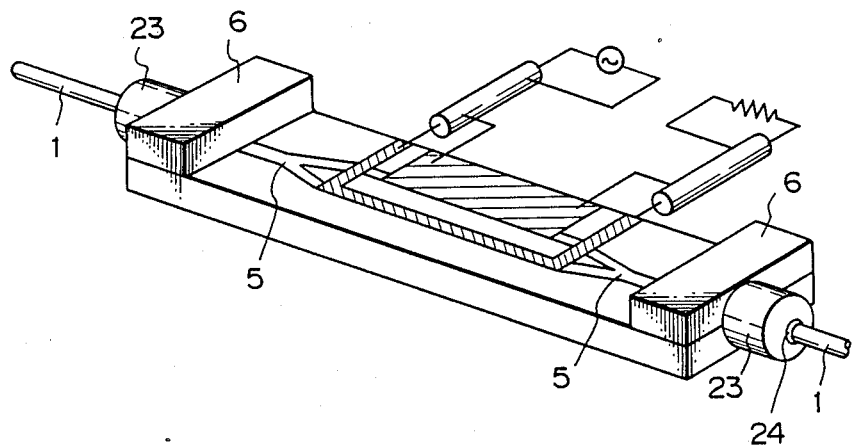
FIG. 31 is a perspective view of the optical modulator according to the present invention.
Figure 32:
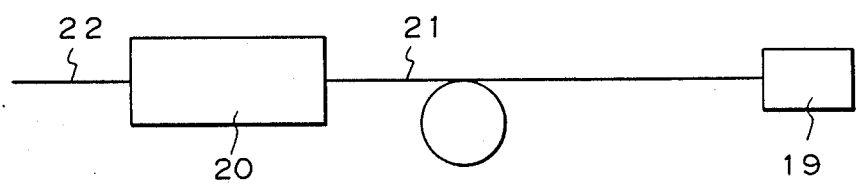
FIG. 32 is an illustration of the optical communication system according to the present invention.

A typical example of an intensity modulator is shown in FIG. 31. In this modulator, the waveguide substrate 4 has a waveguide 5, which is connected through the ruby bead 23 bonded to the fiber 1 with an adhesive 5. This modulator can be used, for example, in the optical communication system of FIG. 32. The modulator 20 is connected through the fiber 21 to the laser 19. The mechanism of this system has been previously described.

Figure 33:
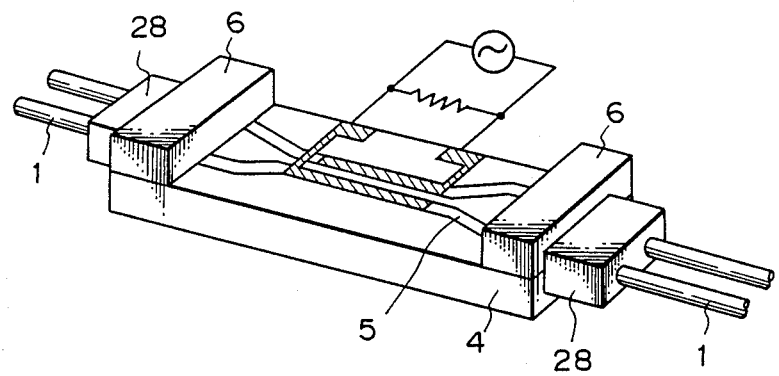
FIG. 33 is a perspective view of the optical switch according to the present invention; and, FIG. 34 is a perspective view of the optical tap according to the present invention.

A typical example of an optical switch is illustrated in FIG. 33. In this device, the fiber holders 28 are used to connect the fibers 1 with the waveguides 5 on the substrate.

Figure 34:
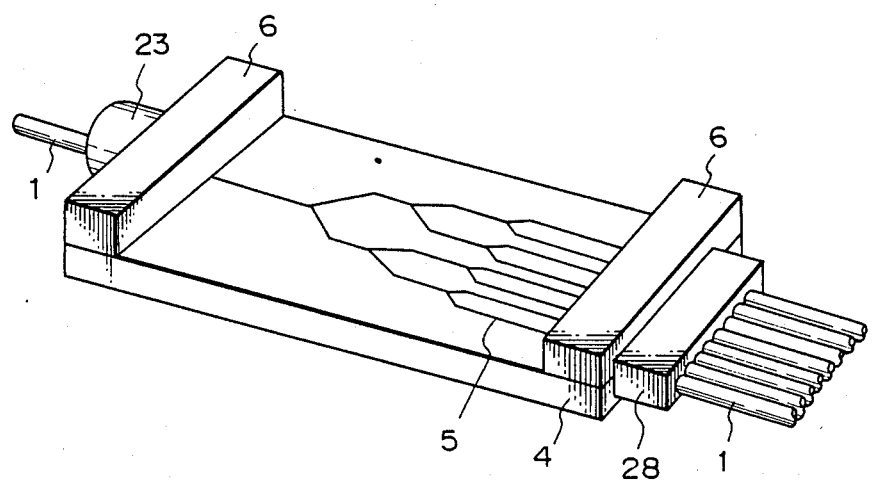

Finally, a typical example of an optical tap is illustrated in FIG. 34. The ruby bead 23 and the fiber holder 28 are used to connect the fibers 1 to the waveguides 5.

We claim:

1. A method for connecting optical fibers to each other by butting and adhering, comprising providing each of the optical fibers with a connection aid having a hole into which the fiber is inserted and secured and from which hole a tip portion of the fiber slightly protrudes, and applying an adhesive to a gap between the two adjacent connection aids.

2. A method according to claim 1, in which the connection aid is light enough to be supported by the optical fiber not having a coating.

3. A method according to claim 2, in which the connection aid is a ruby bead.

4. A method according to claim 2, in which the connection aid is made from metal and a solder is applied to a gap between two adjacent connection aids, instead of an adhesive.

5. A method for connecting optical fibers to optical waveguides by butting and adhering, comprising providing each optical fiber with a connection aid having a hole into which the fiber is inserted and secured and from which hole a tip portion of the fiber slightly protrudes, and applying an adhesive to a gap between an end surface of the waveguide substrate and an opposed end surface of the connection aid.

6. A method according to claim 5, in which a top surface of the waveguide substrate has a block of the same or different material so that a connection area of the end surface of the waveguide substrate is larger than the connection area of the connection aid.

7. A method according to claim 5, in which an inclination angle of the optical fiber relative to the central axis of the hole of the connection aid is 2° or less than the fiber is inserted in the hole.

8. A method according to claim 5, in which the connecting aid is light enough to be supported by the optical fiber not having a coating.

9. A method according to claim 8, in which the connection aid is a ruby bead.

10. A method according to claim 8, in which the connection aid is made from metal and the end surface of the waveguide substrate has a metal coating, and a solder is applied to a gap between the end surface of the waveguide substrate and the connection aid in stead of the adhesive.

11. A method according to claim 5, in which the tip portion of the fiber has a tapered surface.

12. A method according to claim 5, in which the tip portion of the fiber has a rounded surface.

13. A method according to claim 5, in which the tip portion of the fiber has a cleaved cladding end.

14. A method according to any one of claims 11 to 13, in which an end surface of the waveguide and waveguide substrate is inclined at a predetermined angle from the direction perpendicular to the longitudinal axis of the waveguide.

15. A method according to claim 14, in which said angle is 2° or more.

16. A method according to claim 5, in which the waveguide is disposed in a box to define a waveguide module, the box has at least one wall, the coated optical fiber extends through and is secured to a selected wall of the waveguide module box, and a predetermined length of the optical fiber, extending between the tip portion and the wall, has an exposed fiber and is deformably curved.

17. A method according to claim 16, in which the exposed and curved optical fiber has a length of from several millimeters to several centimeters.

18. A method according to claim 5, in which the optical fiber comprises an array of two or more optical fibers secured in the connection aid.

19. A method according to claim 18, in which the connection aid for securing the array of two or more optical fibers comprises a predetermined material and is produced by embedding predetermined numbers of the fibers in the connection aid material, arranging an end surface of said material and the corresponding end surfaces of the respective, embedded fibers in the same plane and selectively etching said material from the end surface to a predetermined depth relative to the end surfaces of the embedded fibers to expose the optical fibers so that tip portions of the fibers protrude from the selectively etched end surface of said material.

20. A method according to claim 18, in which the connection aid for securing the array of two or more optical fibers is produced by arranging and securing optical fibers of the array in an interfacial portion of upper and lower elements of said aid, laterally trimming said aid to make a planar end surface of said aid and selectively etching said aid from said planar end surface thereof to a predetermined depth relative to the end surfaces of the embedded fibers to expose the optical fibers so that tip portions of the fibers protrude from the selectively etched end surface of said aid.

21. An optical waveguide module, the module defining an interior space therewithin, and comprising an optical waveguide, at least one optical fiber and a connection aid, the connection aid having a hole through which the fiber is inserted and to which it is adhered, the optical fiber being butted to the waveguide and the connection aid being adhered to the waveguide, and the portion of the fiber within the interior of the module and extending between the connection aid and the module being stripped to expose the cladding thereof and being bent.

22. An optical waveguide module comprising a casing having at least first and second spaced walls defining an interior space within the casing a waveguide positioned within the interior space, a first coated optical fiber extending through and secured to the first wall, and a first connection aid having a hole through which the first coated fiber is inserted and to which it is adhered, a tip portion of the fiber protruding slightly from the connection aid and into abutment with a first end surface of the waveguide, and an adhesive applied to a gap between the opposed end surfaces of the waveguide and the connection aid, the fiber having a core, cladding covering the core and a coating on the cladding, the coating being stripped rom a portion of the fiber extending between the connection aid and the first wall of the casing to expose the cladding, and the stripped and exposed portion of the fiber being slightly bent.

23. An optical waveguide module as recited in claim 22, further comprising a second coated optical fiber extending through and secured to the second wall, and a second connection aid having a hole through which the second coated fiber is inserted and to which it is adhered, a tip portion of the second coated fiber protruding slightly from the second connection aid and into abutment with a second end surface of the waveguide, and an adhesive applied to a gap between the second end surface of the waveguide and the opposed end surface of the second connection aid, the second fiber having a core, cladding covering the core and a coating on the cladding, the coating being stripped from a portion of the second fiber extending between the second connection aid and the second wall to expose the cladding, and the stripped and exposed portion of the second fiber being slightly bent.

24. An optical fiber holder assembly for permanently connecting, by butting and adhering, the respective tips of a planar array of common end portions of plural optical fibers to corresponding optical waveguide elements, the optical fibers defining respective, substantially straight axes in the end portions thereof and the optical waveguide elements being supported in planar and spaced, parallel relationship on a waveguide substrate, the waveguide substrate having a substantially planar end surface extending generally transversely to the parallel waveguide elements and the waveguide elements having first ends exposed at and coplanar with the substantially planar end surface of the waveguide substrate, the optical fiber holder assembly comprising:
- a holder assembly substrate configured for receiving and supporting therein the respective end portions of plural optical fibers in a planar array and in spaced, parallel axial relationship corresponding to the spaced, parallel relationship of the optical waveguide elements, the holder assembly substrate having a substantially planar end surface extending generally transversely to the parallel axial relationship of the plural optical fiber end portions, as received and supported therein;
- plural optical fibers, respective end portions thereof being received in and supported by the holder assembly substrate, as configured therefor, the end portions of the optical fibers protruding slightly and by a common distance from the planar end surface of the holder assembly substrate while maintaining the planar and parallel axial relationship thereof as defined by and in accordance with the configuration of the holder assembly substrate and with the respective tips thereof in a common plane;
- means for fixing the end portions of the optical fibers, as received in and supported by the fiber holder, to the fiber holder, for positioning same for the aforesaid butting and adhering connection to the respective optical waveguide elements and in aligned relationship therewith, the common distance of the protruding end portions of the optical fibers defining a gap of corresponding configuration between the respective planar end faces of the holder assembly substrate and the waveguide substrate; and
- adhesive means received in the gap for adhering the planar end surface of the holder assembly substrate to the planar end surface of the waveguide substrate, for permanently connecting same together and for adhering the tips of the plural optical fibers to the respective, exposed first ends of the corresponding waveguide elements.

25. An optical fiber holder assembly as recited in claim 24, wherein the adhesive means comprises an UV-curable epoxy adhesive having a refractive index substantially corresponding to that of the optical fibers.

26. An optical fiber holder assembly as recited in claim 24, wherein the aforesaid aligned relationship of the optical fibers with the respective optical waveguide elements is at a desired and selectable common angle of inclination between the common, planar axes of the optical fibers and the normal to the exposed, first ends of the optical waveguide elements.

27. An optical fiber holder assembly as recited in claim 26, wherein the common angle of inclination is selected so as to minimize the TM mode insertion loss of optical transmission from the optical fibers to the respective waveguide elements.

28. An optical fiber holder assembly as recited in claim 24, wherein the end portions of the optical fibers protrude by a common distance of from 10 to several hundreds of micrometers from the planar end surfaces of the holder assembly substrate.

29. An optical fiber holder assembly as recited in claim 24, wherein the common distance is from 50 to 200 micrometers.

* * * * *

UNITED STATES PATENT AND TRADEMARK OFFICE
CERTIFICATE OF CORRECTION

PATENT NO. : 4,948,219

DATED : Aug. 14, 1990

INVENTOR(S) : Minoru SEINO et al.

It is certified that error appears in the above-identified patent and that said Letters Patent is hereby corrected as shown below:

FRONT PAGE:

[57] Abstract, line 12, change "and" to --an--.

Col. 4, lines 52 and 56, change "$l_1$" to --$\ell_1$--.

Col. 6, line 47, change "prutrusion" to --protrusion--;
line 58, change "29(D)" to --28(D)--.

Col. 7, line 17, change "top" to --tip--.

Col. 8, lines 17, 18 and 58, change "top" to --tip--.

Col. 9, line 13, change "d 390" to --d = 390--;
line 20, change "fix" to --affix--;
line 21, change "top" to --tip--;
line 22, change "fixed" to --affixed--;
line 46, change "top" to --tip--.

Col. 11, line 41, change "herein to" to --to herein--.

Col. 12, line 28, change "a end" to --an end--;
line 33, change "top" to --tip--.

Col. 13, lines 59, 63 and 67, change "$l_{11}$" to --$\ell_{11}$--;
lines 65 (both occurrences) and 68, change "$l_{12}$" to --$\ell_{12}$--.

Col. 14, line 3, change "$l_{12}$" to --$\ell_{12}$--.

UNITED STATES PATENT AND TRADEMARK OFFICE
CERTIFICATE OF CORRECTION

PATENT NO. : 4,948,219

DATED : Aug. 14, 1990

INVENTOR(S) : Minoru SEINO et al.

It is certified that error appears in the above-identified patent and that said Letters Patent is hereby corrected as shown below:

```
Col. 15,   line 20, change "than" to --when--;
           line 31, change "in stead" to --instead--.

Col. 16,   line 20, change "butted" to --abutted--;
           line 28, after "casing" insert --,--;
           line 39, change "rom" to --from--.
```

Signed and Sealed this

Ninth Day of June, 1992

*Attest:*

DOUGLAS B. COMER

*Attesting Officer*     *Acting Commissioner of Patents and Trademarks*